United States Patent [19]
Varady

[11] Patent Number: 5,895,028
[45] Date of Patent: Apr. 20, 1999

[54] SINGLE DISC SLIDE VALVE WITH CENTER BIASED FLOW

[75] Inventor: Victor A. Varady, Bartlett, Ill.

[73] Assignee: UOP LLC, Des Plaines, Ill.

[21] Appl. No.: 08/935,391

[22] Filed: Sep. 23, 1997

[51] Int. Cl.[6] .................................................. F16K 3/32
[52] U.S. Cl. ........................................ 251/205; 251/326
[58] Field of Search .............................. 251/205, 326, 251/328

[56] References Cited

U.S. PATENT DOCUMENTS

| | | |
|---|---|---|
| 2,217,834 | 10/1940 | Corbin, Jr. . |
| 2,614,789 | 10/1952 | Labour . |
| 2,636,712 | 4/1953 | Lubbock . |
| 2,883,148 | 4/1959 | Williams ............................ 251/205 |
| 3,370,610 | 2/1968 | Miner . |
| 3,726,306 | 4/1973 | Purvis . |
| 3,964,507 | 6/1976 | Jandrasi et al. . |
| 4,253,487 | 3/1981 | Worley et al. . |
| 4,681,613 | 7/1987 | Porter ............................ 251/205 X |
| 4,798,365 | 1/1989 | Mayhew ............................ 251/205 |
| 5,368,276 | 11/1994 | Pfeifffer . |

*Primary Examiner*—Kevin Lee
*Attorney, Agent, or Firm*—Thomas K. McBride; John G. Tolomei

[57] ABSTRACT

A slide valve for use in throttling the flow of fluid containing solid particles uses a fixed triangle orifice to reduce flow impingement on the wall of the valve defined by the valve body. The triangular shape and its orientation minimizes the flow of particles near the wall and geometrically increases the flow area with the movement of a single disc to reduce the decentralization of flow through the valve as the disc effects flow control.

3 Claims, 3 Drawing Sheets

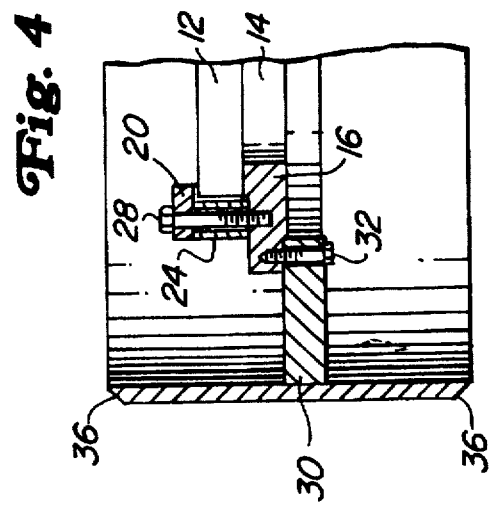
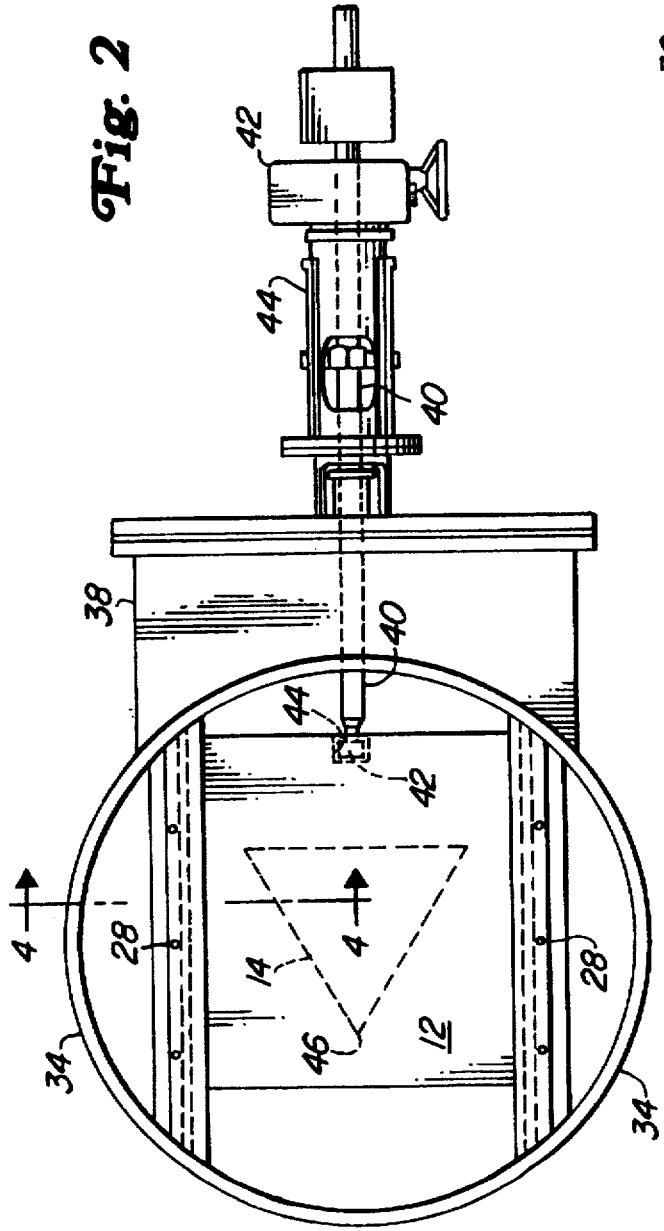
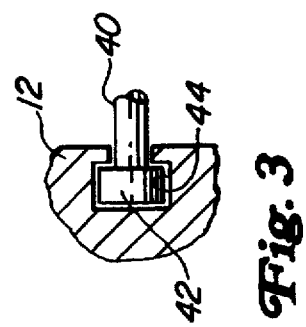

SINGLE DISC SLIDE VALVE WITH CENTER BIASED FLOW

BACKGROUND OF THE INVENTION

1. Field of the Invention

This invention relates generally to valves for throttling and blocking the flow of solid particles and solid particles mixed with gas streams. More specifically, this invention relates to slide valves.

2. Description of the Prior Art

Slide valves find routine application in the throttling of gas streams containing solid particles and the throttling or complete blockage of solids flow. Familiar applications for slide valves include fluid catalytic cracking units, fluid coking units, and fluidized iron ore units. Service conditions for slide valves are typically harsh and operate at temperatures that can vary from atmospheric to over 1600° F., with temperatures typically ranging from 800 to 1400° F. Pressure containment for the valve body and components ranges from atmospheric conditions to over 250 psig. Pressure drops created by flow restriction across the valve will typically range from less than 1 psi to 50 psi. U.S. Pat. Nos. 3,726,306 and 3,964,507 show typical slide valve arrangements that have a sliding disc retained in a slot for sliding movement across an orifice that serves as a variable flow path opening for throttling or occluding flow.

Slide valves are not ordinarily used to provide gas tight sealing, but are understood to be throttling or flow blocking devices. Slide valve arrangements for blocking or throttling flow have traditionally used a single disc to cover the orifice opening. Throttling valves have an orifice opening which offers a reduced flow are relative to the nominal line size in which the valve is placed. An orifice plate fixed with respect to the valve body defines the orifice opening for most valve arrangements. In throttling operations, the orifice opening ordinarily provides a flow area substantially less than the flowing diameter of the line across which the valve regulates flow. Sizing of the orifice opening usually restricts its open flow area during operation to about 50 to 80% of total area of the orifice opening.

It is known to use different disc or orifice configurations to program the flow control of the response of the valve through the range of disc movement. The use of triangular orifice openings in a slide valve is known from U.S. Pat. No. 5,368,276. In this valve arrangement, the triangular orifice opening is defined by the movable disc and moves with respect to the orifice opening defined by the valve.

As the disc changes positions across the opening of the orifice, downstream flow characteristics of the fluid and particles is affected. In order to avoid or reduce erosion on downstream piping, it is highly desirable to keep the flow of particles and fluid centered in the orifice opening. As the size of the orifice opening changes with position of the disc during throttling, the centralization of the flow stream with respect to valve body and piping will change. Maintaining the flow as centralized as possible through the valve minimizes erosion downstream of the disc and orifice which by contact of catalyst the surfaces of the valve body.

The combination of high velocity gases and elevated temperatures can lead to severe erosion problems in slide valves. Elevated temperatures significantly reduce the physical strength and hardness of the valve material. Erosion substantially reduces the operating life of valves when it occurs. When erosion becomes severe enough, valve components must be replaced—usually requiring the shutdown of expensive operating equipment.

One of the most severely erosive environments is encountered when regulating the discharge of flue gases from an FCC unit. This slide valve in a flue gas operation regulates the pressure of the FCC regenerator by throttling the discharge of exhaust gases created by the combustion of coke from catalyst particles. This slide valve operates in combination with a series of fixed orifices located in a chamber that reduces the pressure of the flue gas from a range of from 15 to 30 psi to atmospheric conditions. Fixed orifices usually account for half of the pressure drop imposed by the flue gas. The remaining approximately other half of the pressure drop occurs across the slide valve and varies as pressure is adjusted through the throttling of the slide valve. Flue gas typically leaves an FCC unit at elevated temperatures of over 1200° F. and as high as 1500° F. The loading of solid particles or catalyst in the flue gas is relatively light—typically in the order of 0.05 lbs/ft$^3$. However, the velocity of flue gas through the valve approaches sonic velocity and is usually as high as 0.5 to 0.75 mach. The high velocity and high temperature of the gas and catalyst can result in severe erosion on the surfaces of the slide valve.

A number of slide valve arrangements are taught with specific objective of better adapting the valve to the erosive environment of flue gas and particulate solids. Valve designs that include components and arrangements for suitability to erosive environments include U.S. Pat. Nos. 2,217,834; 2,614,789; 2,636,712 and 3,370,610.

It is known from U.S. Pat. No. 4,253,487, the contents of which are hereby incorporated by reference, to center flow in a slide valve to reduce erosion. U.S. Pat. No. 4,253,487 teaches the use of two opposing discs in a slide valve that are retracted from each other to define a central opening that remains centered across the flow area of the orifice as the open area of the orifice changes through repositioning of the discs. While the dual disc slide valve keeps the central section of the flow centered with respect to the axis of movement of the discs, it adds the expense and complexity of supplying and operating a valve with dual discs. The opening provided by the dual discs also has fixed sides in the direction transverse to disc movement. The constant width of the orifice opening in a direction normal to direction of the disc movement limits its ability to reduce erosion with respect to the portion of the valve adjacent the constant width section.

SUMMARY OF THE INVENTION

It is an object of this invention to provide a single disc slide valve that uses a single disc for throttling fluid and biases flow toward the center of the valve body.

Another objective of this invention is to provide a slide valve that reduces fluid and particulate flow near the valve body.

Accordingly, in the present invention, a triangular orifice opening is fixed in the valve body of a slide valve and oriented to minimize flow near the outer portions of the valve body while also serving to centralize flow with respect to the valve body as the disc cycles in its normal range of operating positions. The use of a fixed triangular shape for the orifice opening orients the peaks of the triangle near the outer portion of the valve body. As the peaks of the triangle are oriented to the outer portion of the valve body, they provide the most limited flow area where the periphery of the orifice opening comes closest to the valve body. Accordingly, the triangular shape has a self limiting effect on flow that is located the maximum distance from the center of the primary axis of the valve body. The triangular shape is also oriented with diverging sides oriented to increase the opening width across the orifice as the disc is withdrawn from the orifice opening into the valve bonnet to increase flow path across the orifice. The diverging sides thereby provide a geometric increase in the flow area with progressive opening of the disc as it is retracted from the flow passage. The progressively greater flow area provided with decreasing disc movement allows adjustment of the flow with reduced variation in the center of the flow path as the flow area becomes progressively greater. Accordingly, once the valve is in a normal open position, throttling of the valve is highly responsive to small disc movements so that the orifice can be sized and positioned to maintain flow in a relatively centralized area with only a single control disc.

Accordingly, in one embodiment, this invention is a slide valve adapted for use in flow control of fluid streams containing erosive particles. The valve includes a valve body comprising a wall that defines a central passage along a linear flow path. The linear flow path connects a inlet and outlet for flow in a single direction along a primary axis of the valve body. The valve body also defines an opening transverse to the primary axis. The valve body holds a single disc member. The disc member is slideably mounted at the location of the transverse opening for movement normal to the primary axis of the valve body. The disc member defines a leading edge for contacting the fluid stream. A pair of guides slideably retains the single disc in the valve body. Means are provided for selectively moving the disc in the guides from a closed position to an open position. An orifice plate fixed with respect to the valve body and located adjacent to the disc defines an orifice opening in a plane perpendicular to the primary axis. The orifice opening presents a triangular cross-section to the flow stream. The triangular cross section is located with the apex of the triangle closest to the leading edge of the disc when the valve is in a closed position. This positioning reduces the volume of the stream that is discharged adjacent to the wall of the valve body and centralizes the discharge of flow with respect to the valve body.

Additional aspects, embodiments, and details of the invention can be appreciated from the following Figures and the Detailed Description.

BRIEF DESCRIPTION OF THE DRAWINGS

FIG. 2 is a top plan view of the valve of FIG. 1.

FIG. 3 shows a connection for the stem of a valve to a moveable disc.

FIG. 4 is a cross-section taken across line 4—4 of FIG. 2.

DESCRITION OF THE PREFERRED EMBODIMENT

Figure 1:
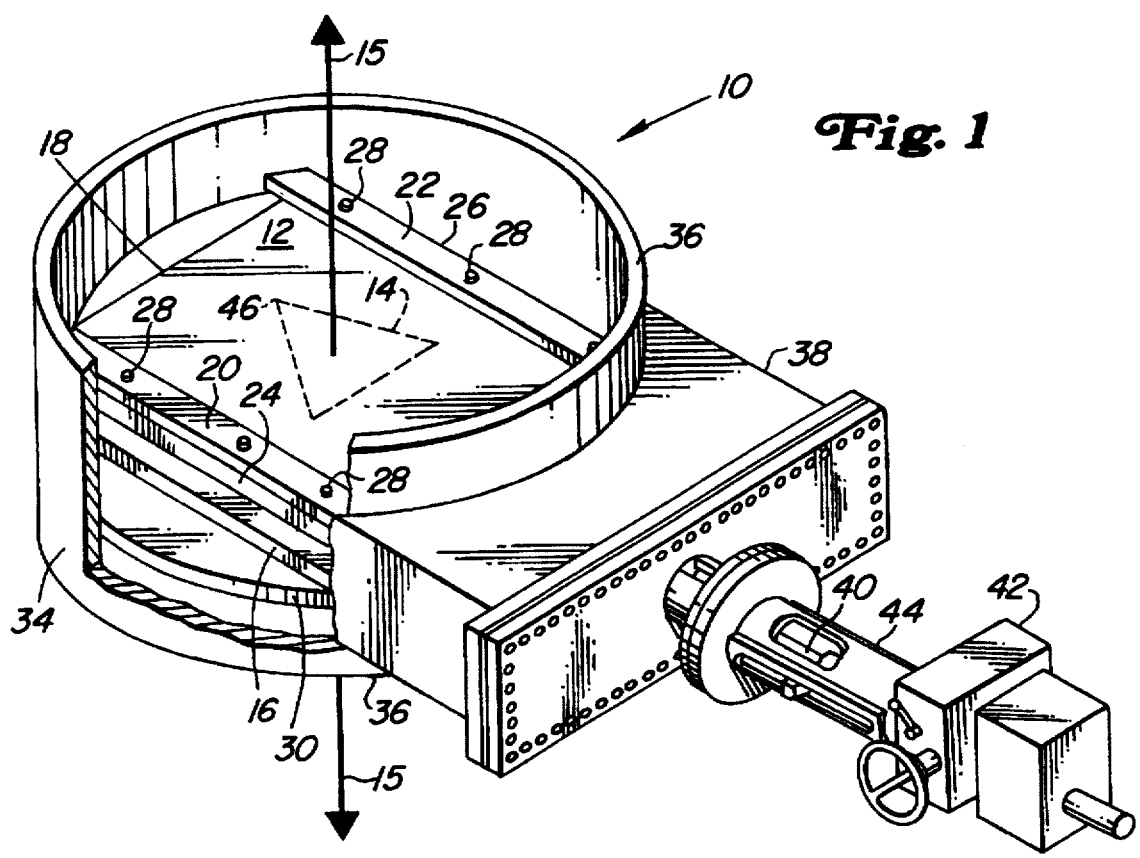
FIG. 1 is a perspective view of a slide valve cut away to show its internals.

The drawings disclose a multi-position slide valve, 10 which is particularly adapted to fluidized solid service, especially for throttling flow and more particularly for use in controlling the flow of erosive fluids which contain solids. The valve comprises a single disc 12, which is shown covering a valve orifice 14. The disc is positioned directly against an orifice plate 16 that defines orifice opening 14. The transverse sides of the orifice opening 14 are, preferably, parallel to the flow. Disc 12 is a solid member having a generally rectangular cross-section which is squared or straight along its inner or leading edge 18. Means for providing hard surfacing or other abrasive resistant lining around the orifice opening are known to those skilled in the art and may be employed in the arrangement of slide valves in accordance with this invention.

On the upper side of disc member 12 and disposed adjacent to the transverse sides or edges thereof are a pair of essentially parallel elongated guide bars 20 and 22 which ensure that the movement of the slides will be limited to a back and forth motion transverse to the direction of flow and inhibiting movement of the disc along the primary axis 15 of the valve. As shown more clearly in FIG. 4, guide bars 20 and 26 are secured to side retainer bars 24 and 26 that are located directly therebelow. Side retainer bars 24 and 26 prevent side-to-side movement of the disc 12, normal to the primary and intended direction of travel for the disc. Critical tolerances for the disc and the guides along with positioning of the disc above the orifice opening are well known to those skilled in the art of slide valve design.

A bolt 28 extends through guide bar 20 and retainer bar 24 in a typical arrangement to retain the guide bar and retaining bars in the orifice plate 16. A series of bolts 32 retain the orifice plate on the top of a valve seat plate 30. Plate 30 extends radially outward and is welded to valve body 34. The outer edges 36 of valve body 30 are ordinarily welded to connecting pipe or may be provided with suitable flanges for a bolted connection into a piping system.

The valve disc 12 reciprocates inwardly and outwardly into a valve bonnet 38. Valve body 34 defines a transverse opening in its sidewall to accommodate movement of the disc into and out of bonnet 38. A valve stem 40 extends through the opening and into the bonnet for controlling the position of disc 12. As shown in FIG. 3, disc 12 retains an upset end 42 of stem 40 into a recess 44. Stem 40 passes into an operator mounted on the end of a pedestal 44 for positioning the disc within the valve in a desired location. Appropriate means for preventing leakage around the valve stem such as a standard stuffing box arrangement would normally be provided with the valve. Operator 42 may be any type that will retain the disc in a desired location and may be pneumatically, hydraulically, or electrically controlled by pistons, cylinder system, diaphram, electric motor, or step positioning system. The operators may be remotely or manually controlled as desired. Bonnet arrangements and control systems for positioning the discs are well known to those skilled in the art of slide valve design.

Figure 5:
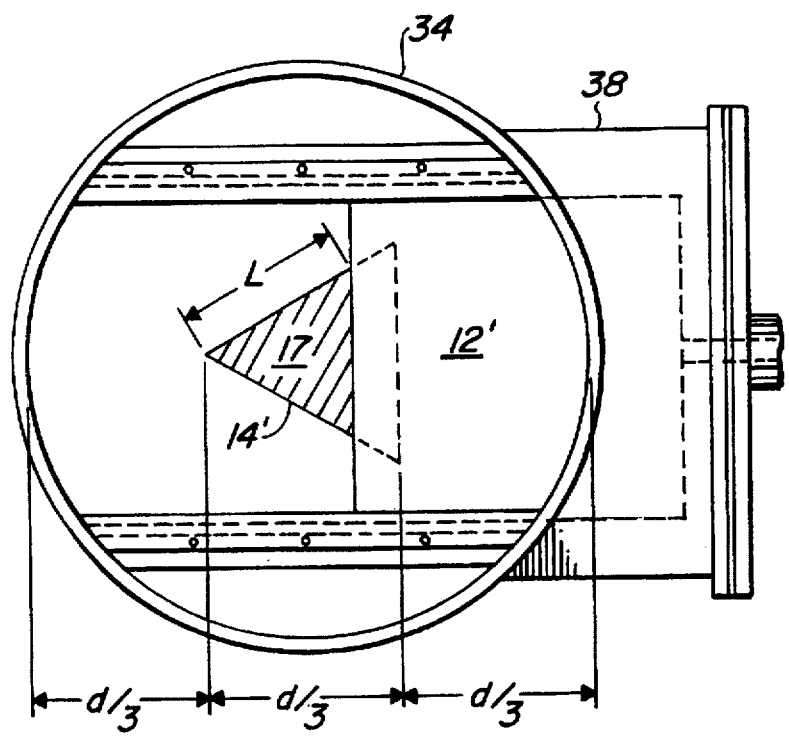
FIG. 5 is a top view of the valve of FIG. 1 showing the disc in a normal operating position.

The orifice opening has a generally triangular shape. The apex 46 of the triangle 14 is directed away from the valve bonnet so that a leading apex of the triangle is first uncovered by retraction of the valve disc 12 toward the bonnet. Looking then at FIG. 5, valve disc 12' is shown in a retracted position that opens the shaded area 17 of orifice 14' for flow of the particle and gas mixture. The preferred configuration for the triangular orifice opening is an equilateral triangle. An equilateral triangle provides equal lengths to all sides of the orifice opening as the disc is retracted. A preferred position for the equilateral triangle is shown by FIG. 5 wherein the lead apex and the base of an equilateral triangle are each located ⅓ of the diameter D across the valve body. This position give the orifice opening some unique properties. When the disc is positioned to open a triangular area such that all of the apexes of the triangle are equi-distant from the circular perimeter of valve body 34, the orifice opening provides an open flow area equal to approximately 72% of its total open area. Thus an orifice opening having an equilateral triangle arrangement as depicted in FIG. 5 will provide the best centralization of flow wherein the distance to the valve body is minimized at all three corners of the triangle. Furthermore the rate of increase for the flow area as the valve disc is retracted to further open the orifice is maximized by the diverging sides. Accordingly, sizing the valve such that its normal flow area equals approximately 72% of its total orifice area will result in a valve that operates with normally centralized flow through most of its expected deviation from the normal operating position during throttling of the valve. Small advancement or retractions of the disc will create large variations in the flow area with only minor affects on the centralization of flow through the valve.

Figure 6:
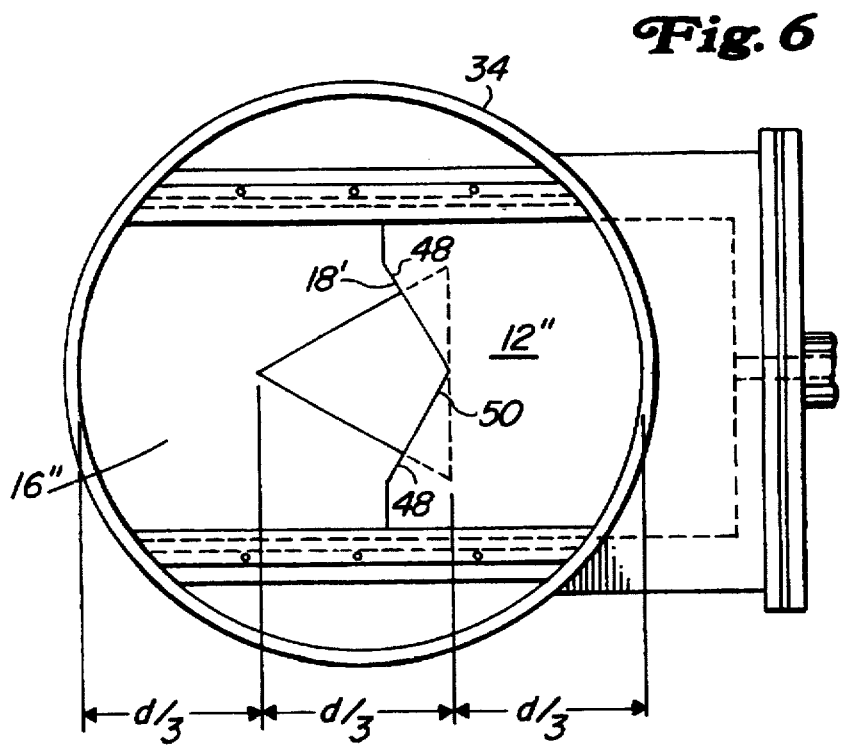
FIG. 6 shows the valve of FIG. 1 with a modified slide valve disc.

FIG. 6 shows a further variation in the arrangement of valve 10 wherein a modified disc 16" has a leading edge shaped with a "V" notch 18'. In this arrangement, the orifice opening will have a quadrilateral shape. The "V" notch can provide further centralization of the flow and minimization of erosion on the valve body by channeling flow into the back portion of the orifice opening that is still located at a distance equal to at least D/3 from the side wall. The "V" notch allows the back area of the orifice to be opened without further advancing corner 48 towards the wall of the valve body. In order to prevent the apex 50 of "V" notch from channeling flow close to the bonnet section of the valve, a shallow "V" notch angle is preferred. Preferably the V-notch angle of the disc will be less severe than the apex angle of the triangular orifice opening.

What is claimed:

1. A slide valve adapted for use in flow control of fluid streams containing erosive particles, said valve comprising:

a valve body comprising a wall defining a circular, central flow passage along a linear flow path that connects an inlet and an outlet for flow in a single direction along a primary axis of said valve body and defining an opening transverse to said primary axis;

a single disc member retained in said valve body at the location of said transverse opening for movement normal to said primary axis and defining a leading edge for contacting said fluid stream;

a pair of guides for slidably retaining said disc in said valve body;

means for selectively moving said disc in said guides from a closed position to an open position; and, an orifice plate fixed with respect to said valve body and located adjacent to said disk, said disc, said orifice plate defining an orifice opening perpendicular to said primary axis, said orifice opening having a cross section in the shape of an equilateral triangle with an apex of the triangle positioned closest to said leading edge when the valve is in a closed position and the base of the triangle defining the orifice positioned normal to the direction of disc movement to reduce the volume of said stream that is discharged adjacent to the wall of said valve body and centralize the discharge of flow with respect to the valve body wherein the apex and the base of the triangle are located away from the wall of the valve body by a distance equal to ⅓ of the diameter of the central flow passage.

2. The slide valve of claim 1 wherein the leading edge of said disc defines a V-notch that together with said orifice opening defines an opening for the fluid stream having a quadrilateral shape and wherein the v-notch angle of the disc is more shallow relative to apex of the orifice.

3. The slide valve of claim 2 wherein the side walls of said plate defining said orifice opening extend uniformly in the direction of the primary valve axis.

* * * * *